United States Patent [19]

Fischer

[11] 4,351,205
[45] Sep. 28, 1982

[54] APPARATUS FOR THE AUTOMATIC SHIFTING OF A STEPPED SPEED-CHANGE TRANSMISSION, ESPECIALLY FOR AUTOMOTIVE VEHICLES

[75] Inventor: Günter Fischer, Markdorf, Fed. Rep. of Germany

[73] Assignee: Zahnradfabrik Friedrichshafen, Friedrichshafen, Fed. Rep. of Germany

[21] Appl. No.: 22,475

[22] Filed: Mar. 21, 1979

[30] Foreign Application Priority Data

Mar. 23, 1978 [DE] Fed. Rep. of Germany ....... 2812742

[51] Int. Cl.³ ..................... B60K 41/06; B60K 41/28
[52] U.S. Cl. .................................................. 74/866
[58] Field of Search .............. 74/866, 878; 192/3.28, 192/4 A, 4 B

[56] References Cited

U.S. PATENT DOCUMENTS

| | | | |
|---|---|---|---|
| 3,604,288 | 9/1971 | Mori | 74/866 X |
| 3,741,042 | 6/1973 | Ravenel | 74/866 |
| 3,885,472 | 5/1975 | Wakamatsu et al. | 74/866 |
| 4,039,061 | 8/1977 | Pruvot et al. | 74/866 X |
| 4,044,634 | 8/1977 | Florus et al. | 74/866 |
| 4,140,031 | 2/1979 | Sibeud et al. | 74/866 |
| 4,208,925 | 6/1980 | Miller et al. | 74/866 |
| 4,208,929 | 6/1980 | Heino et al. | 74/866 X |

FOREIGN PATENT DOCUMENTS

| | | |
|---|---|---|
| 967268 | 5/1975 | Canada .............................. 74/866 |
| 2412753 | 9/1975 | Fed. Rep. of Germany . |
| 2338122 | 5/1976 | Fed. Rep. of Germany . |
| 2532008 | 2/1977 | Fed. Rep. of Germany . |
| 2715999 | 11/1977 | Fed. Rep. of Germany . |

Primary Examiner—Rodney H. Bonck
Attorney, Agent, or Firm—Karl F. Ross

[57] ABSTRACT

In an automotive vehicle having an engine connected to a gear-type transmission via a torque converter and a 1x converter-bridging clutch, an electronic circuit for automatically shifting the transmission and operating the clutch comprises a comparison-pulse generator emitting pulses having durations varying in accordance with engaged gear ratio and engine-loading conditions, these pulses being fed to the data inputs of a pair of D-type flip-flops for a time comparison with clock-input signals from a multiplexer/counter having periods proportional to the rotation rate of a converter turbine during a first processing phase of a time-division operating cycle and to the rotation rate of a transmission output shaft during a second processing phase. The flip-flops generate upshifting and downshifting signals for updating the contents of a converter-clutch store during the first phase and of a gear-state store during the second phase, the gear-state store being connected via an output circuit to gear-shift actuators in the transmission. The control device includes a read-only memory (VP) responsive to a gear-state signal from the gear-state store and to drive-program signals from a program selector for preventing the updating of the gear-state store by an upshifting signal when the engaged gear state is the maximum for the selected drive program. The device has another read-only memory (ZP) responsive to gear-state signals and a gear-change signal from a detector/comparator (GK) for modifying the moduli of counters (UZ, RZ, VWZ, OWZ) controlling the durations of respective gear-change operations.

15 Claims, 9 Drawing Figures

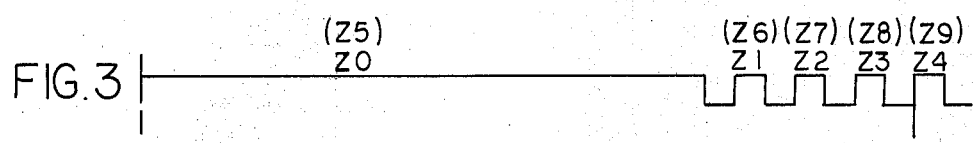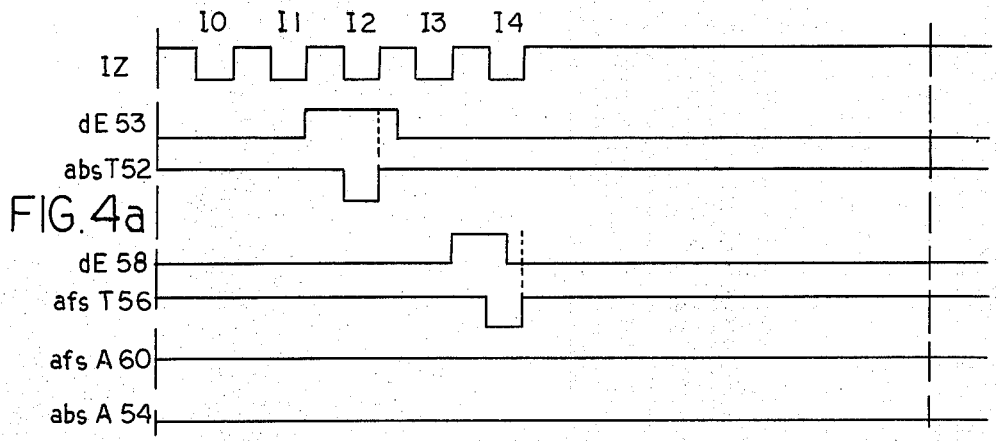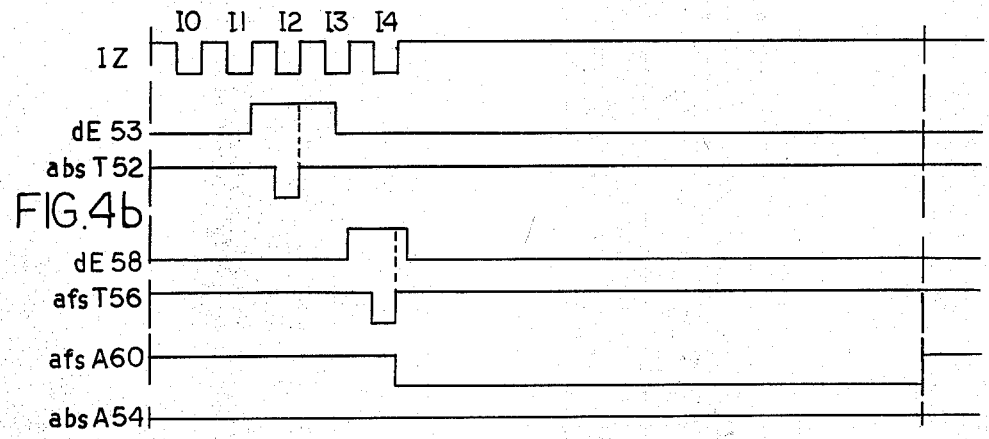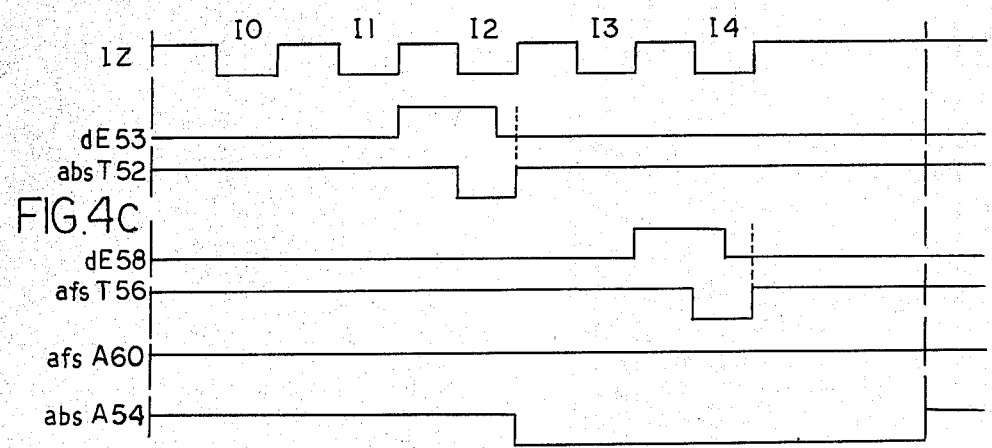

APPARATUS FOR THE AUTOMATIC SHIFTING OF A STEPPED SPEED-CHANGE TRANSMISSION, ESPECIALLY FOR AUTOMOTIVE VEHICLES

FIELD OF THE INVENTION

My present invention relates to an electronic device for the automatic shifting of a stepped gear-transmission especially in automotive vehicles.

BACKGROUND OF THE INVENTION

An electronic transmission-shifting control implemented with digital logic is known in which a shifting process is conducted substantially in dependence upon the output RPM and a torque stage of the transmission (German patent document-Auslegeschrift No. 2,338,122).

Actual acceleration values are determined from the output RPM. These are compared for each speed ratio with stored acceleration values. Upshifting and downshifting are effected in dependence upon the output RPM (i.e. the rotation rate of a transmission output shaft) which is compared with stored speed-ratio-dependent, torque-dependent and acceleration-dependent RPM limits. The upshifting is effected, for example, in the torque stage of full gas or kick-down and reduced acceleration values, corresponding to reduced torque reserves, later than with higher levels of the latter. The larger ratio effective after shifting can, in spite of full engine power, lead to negative vehicle acceleration.

Moreover, a jerk-free shifting cannot be ensured since upon a speed change there is no possibility of influencing the timing of the closing and opening of the clutches to be shifted.

If the vehicle is moving down an incline, for which additional engine braking is desired to supplement the mechanical or hydraulic brakes, the momentum can result in an upshifting which further accelerates the vehicle, especially a load-carrying or utility vehicles with a torque converter and a retarder requiring total control to ensure an optimum shifting ratio in the corresponding use ranges of the vehicle for different operating conditions.

OBJECT OF THE INVENTION

The object of the invention, therefore, is to provide an automatic shifting device for a stepped transmission that:

can be used for utility vehicles, trucks and passenger vehicles, enables shifting in as jerk-free manner as possible, enables a precisely controlled load transfer on the clutches in dependence upon transmission and vehicle type, ensures an optimal shifting with respect to time, as the opening time of a converter-bridging clutch, enables stable operation with negative acceleration after upshifting in spite of full engine power because of the higher transmission ratio, ensures a defined retarder opening interval dependent upon the upshifting and downshifting process, enables the generation of an engine braking signal to condition an upshifting, excludes an upshifting when a retarder output signal or auxiliary drive signal are produced or a new drive program election with lower speeds is chosen.

The objects are achieved with the features given in the characterizing clauses of the claims.

Advantageously, the proposal according to the invention of an automatic shifting device especially enables optimum transmission control by the use of programmable fixed value storage (PROM), as is known per se, for various passenger and utility vehicles. When other supplying limits are required, it is only necessary to change the fixed value storage. The wide range of possibilities with the proposal of the present invention enables economical production.

BRIEF DESCRIPTION OF THE DRAWING

In the annexed figures an embodiment of the invention is described which is a digital automatic shifting device for a six-speed transmission.

FIG. 3 shows the sequencing of a cycle counter ZZ of FIGS. 1 and 2;

FIG. 4a shows the sequencing of a period-duration comparator shown in FIGS. 1 and 2;

FIG. 4b shows a sequencing of the period-duration comparator with an upshifting;

FIG. 4c shows the sequencing of the period-duration comparator with a downshifting;

SPECIFIC DESCRIPTION

Figure 1:
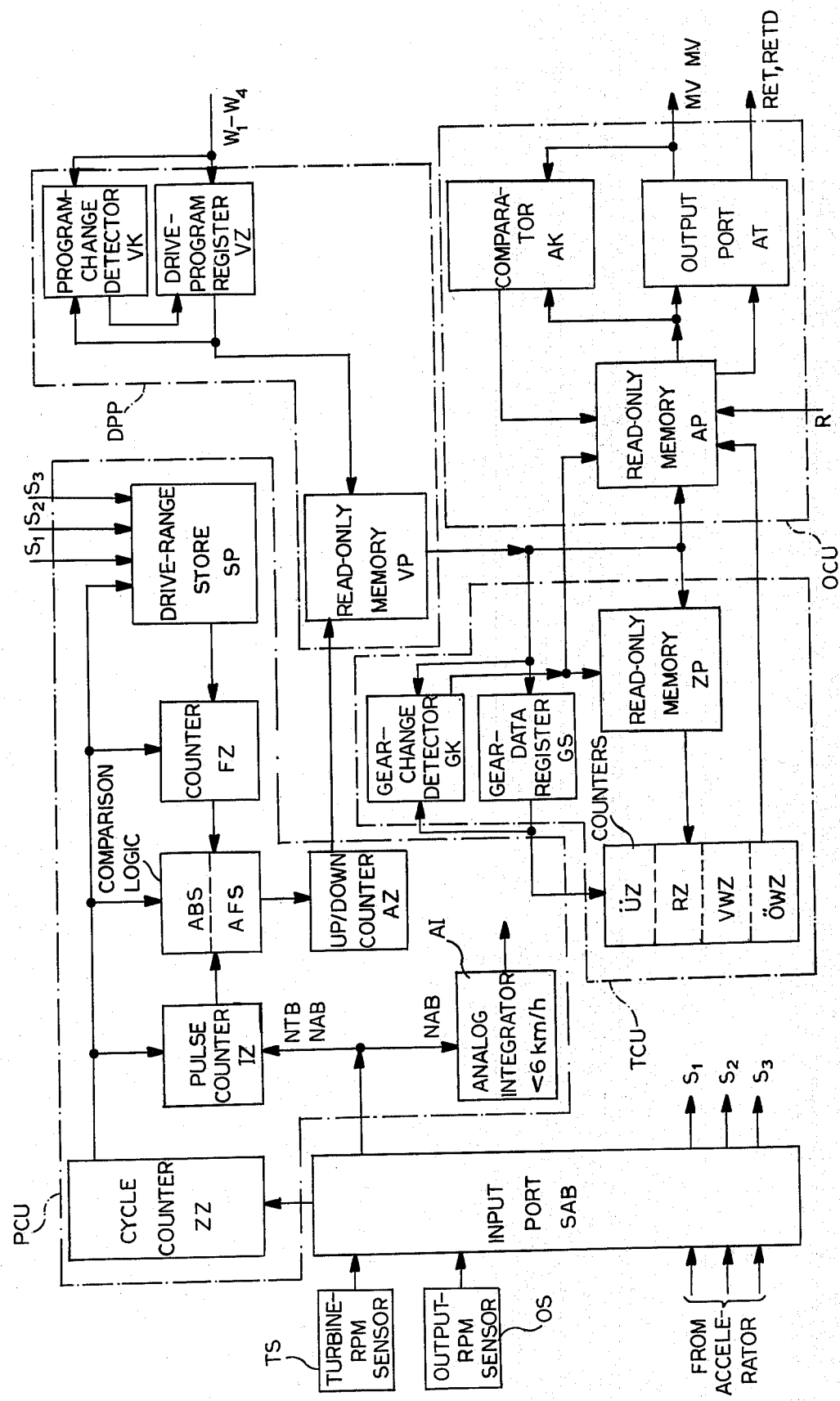
FIG. 1 is a block diagram of the automatic shifting control device according to our present invention.
Figure 7:
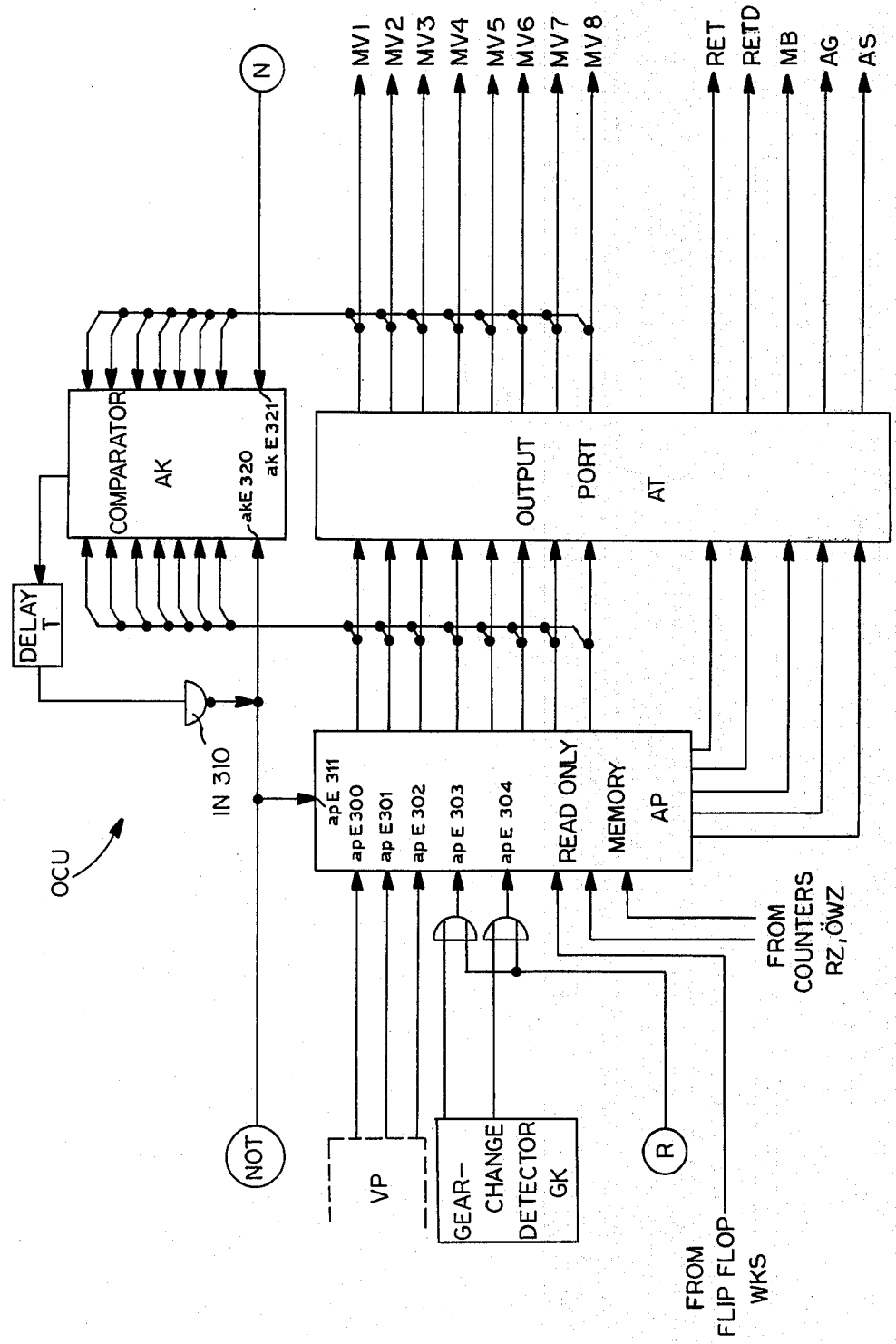
FIG. 7 shows an embodiment of an output circuit.

The digital automatic shifting system of FIG. 1 determines, based upon several input signals, the transmission-shifting state and controls the corresponding setting or transmission actuating members. The input signals include: a drive-shaft rotation rate signal NAB, a turbine-RPM signal NTB, three engine-load signals S1 (partial load) S2 (full load) and S3 (kickdown), a retarder signal RETS (FIG.2), an auxiliary output signal NAS (FIG. 2) and an emergency signal NOT (FIG. 7).

The measured values are obtained for the output-RPM NAB and turbine-RPM NTB in a manner known per se at the respective locations of the transmission via inductive-optical or other frequency generators TS and OS (FIG. 1) and are converted into pulses whose durations correspond to full or partial revolutions, i.e into signals whose durations are proportional to the rotation rates of the transmission output shaft and the converter turbine, respectively. The data for the load signals S1, S2 and S3 (FIGS. 1 and 2) are obtained from the gas-pedal setting.

Figure 5:
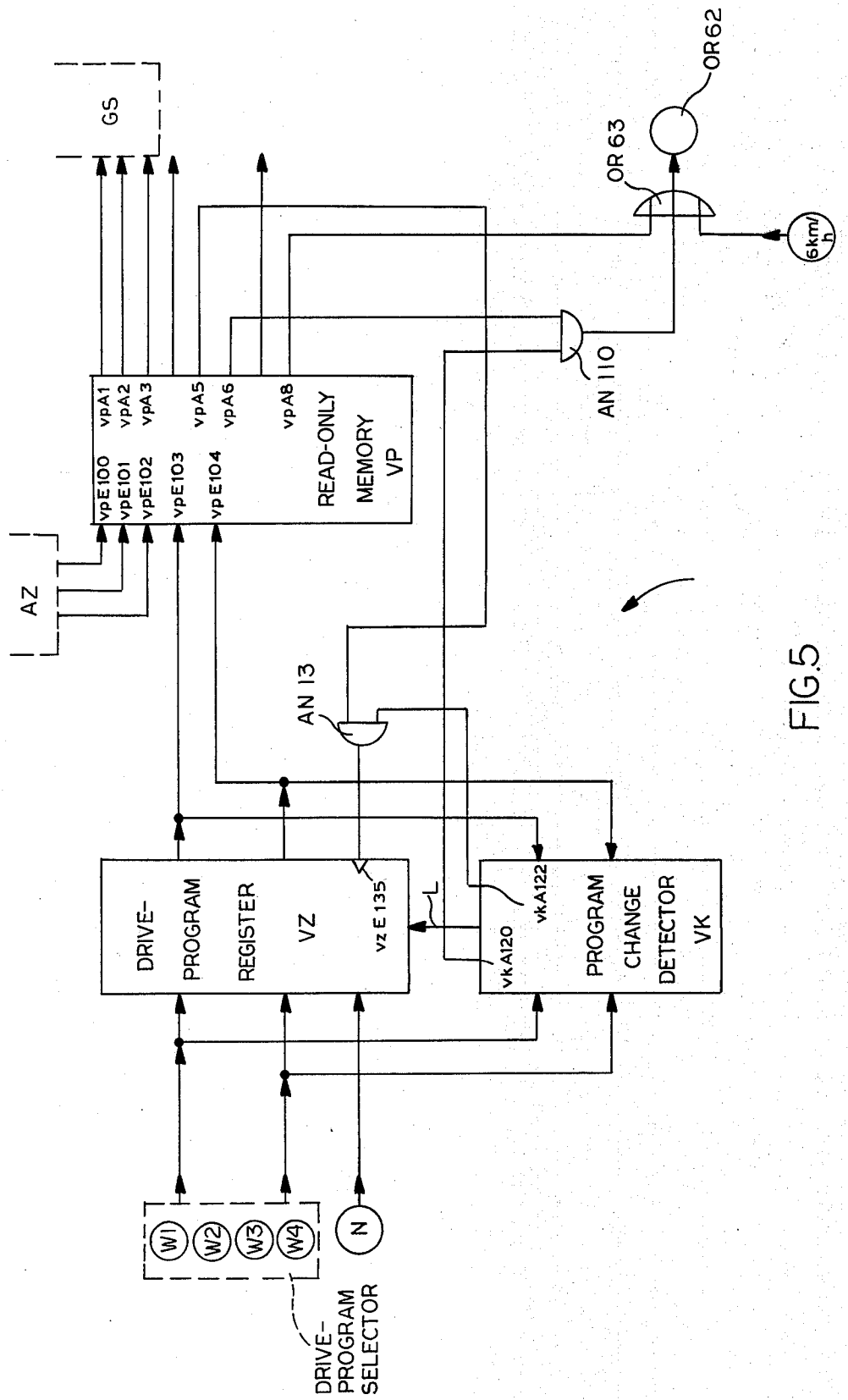
FIG. 5 shows an embodiment of a preselection circuit.

The digital shifting-system data of the drive program selection are supplied as further input signals, for example via a pad switch or push button switch with neutral and reverse setting and four forward drive programs W1, W2, W3 and W4 (FIGS. 1 and 5).

The outputs of the digital shifting system include the following signals for controlling actuating members:

Magnetic-valve signals MV1-M8 (FIGS. 1 and 7) for the shifting of eight clutches, a retarder-output signal RET, a retarder-pressure-reduction signal RETD, an engine brake signal MB, an anti-gas-control signal AG and a starting-lock signal AS.

From the block circuit diagram of FIG. 1, the principal elements of the automatic switching system of the present invention can be seen:

The above-mentioned input signals, apart from the drive-program preselection, are modified in a signal preparation unit SAB to the operating voltage of the digital electronics, i.e. for example, a 24-volt pulse height of the input data is modified to 5 volts.

A digital automatic shifting system according to my present invention comprises substantially four functional control units:
- a period-timing comparator unit PCU,
- a drive-program preselector unit DPP;
- a timing or sequencing control unit TGU,
- an output control unit OCU.

In the period-time comparator unit PCU the periods of signals NAB, NTB coding the rotation rates of the output shaft and the turbine are compared with durations programmed in a programmable read-only memory (PROM) SP. The resulting information is then translated into speed-ratio information corresponding to the drive diagram and into converter-clutch information.

To this end, data for the upshifting and downshifting characteristics of the transmission and for the converter-bridging clutch are stored in programmable fixed-value storage, i.e. shifting-point programmable read-only memory (PROM) SP; via two of the five addressing inputs of this fixed-value storage the load state is additionally supplied. In the load state S2=0 and S3=0 the data for partial-load operation for the upshifting and downshifting characteristic controls, while when S2=1 and S3=1 the data for kickdown is controlling. In each measuring cycle, in dependence upon speed setting and the load state, the respective data for the upper and lower limits of the speed ratio range are read out and supplied to a window generator FZ in the form of a counter.

The window counter FZ generates comparison pulses corresponding to the upper and lower drive range limits, these pulses being compared in a pulse-comparison logic IZ, ABS, AFS with the pulses measured at the turbine and output shafts.

The comparison logic comprises an upstorage or upshifting control unit AFS and a downstorage or downshifting control unit ABS in the form of two D-type flip-flops.

At the end of a comparison, the information concerning the turbine rotation rate is supplied to a converter-clutch storage or memory WKS (see FIG. 2) and the information concerning rotation rate of the output shaft is supplied to a speed-ratio storage or memory in the form of an up/down counter AZ which then, depending upon the result, maintains its contents or effects an up or down counting process. In the up/down counter AZ, the instantaneous actual speed (or gear-ratio) state is stored.

The sequence control or operations timing of the period-duration comparator unit is effected by a cycle counter ZZ and a pulse counter IZ.

As a further device, an analog integrating detector circuit AI is provided for low speeds, for example less than 6 km per hour, which directly controls the converter clutch storage WKS (see FIG. 2) as well as a reversing lock VRL. To limit false interpretation at low speed ranges, the output signals below 6 km per hour bypass the digital period comparison.

In the preselection circuit DPP the speed-ratio information obtained by the period-duration comparison is combined with predetermined preselection parameters before the final clutch combination is obtained. Thus the preselection circuit DPP assumes the following tasks:

(1) Selection of the drive-range programs W1 to W4;
(2) Prevention of impermissible program jumps;
(3) Preventing of impermissible upshifting jump; and
(4) Selection of the converter clutch state in dependence upon speed ratio.

To this end there is provided a programmable fixed-value storage, i.e. a preselection programmable read-only memory (PROM) VP (FIGS. 2 and 5), whose data is selected via the up/down counter AZ and by the input information of the drive-range programs W1 to W4, as shown in FIGS. 1 and 5. The addressing is effected via three inputs vpE 100, vpE 101 and vpE 102, through which the dual-coded speed-ratio information from counter AZ VP is supplied to preselection PROM VP, and via two further inputs vpE 105 and vpE 104, through which one of the four forward-drive programs in dual coding is fed to the preselection PROM VP. In the neutral setting N a preselection counter VZ is extinguished.

Forward counter VZ is provided in parallel with a preselection comparator VK as a recognition device for a drive-program change.

Timing or sequencing control circuit TCU ensures a time-controlled shifting sequence during a speed-ratio change. For this purpose various digital counters UZ, RZ, VWZ, OWZ (FIGS. 1 and 6) are provided which, triggered by a cadence or clock frequency, produce defined time intervals. Thus, after detection of a shifting operation by a speed-ratio-change comparator GK the timing information stored in a programmable fixed-value storage, i.e. a programmable read-only memory timing (PROM) ZP, is successively transmitted to corresponding counters VWZ and OWZ, RZ, UZ and the timing sequence is started.

The following controls by time sequence are possible:

An overlap-time counter UZ permits a programmable transition time upon speed or gear-ratio change.

A retarder counter UZ establishes a defined retarder open duration or actuation interval.

Two counters are provided for the timed control of the converter clutch. A delay converter clutch counter VWZ permits a programmable delay. While the opening converter counter OWZ ensures a definite opening or deactuation time.

The output or actuator-energizing circuit OCU (FIGS. 1 and 7) mainly produces, from the speed-ratio information (clutch control signals MV1–MV8), the associated clutch information and prepares the latter for the control of the magnetic valves.

In an output unit AP, also a programmable fixed-value storage or read-only memory (PROM), the speed-ratio and transmission-specific clutch information are stored together with the speed-ratio-dependent clutch information in the transition period during the up and downshifting.

The remaining output information, recovered from the combination of various signals (e.g. from flip-flop WKS, counters RZ, OWZ), is also prepared to control setting members.

For the additional operational reliability, an output safety is provided whereby, upon a failure, all magnetic valves are deenergized.

The construction and function of the sequence control and the period duration comparator unit PCU are now described with reference to FIGs. 2–4c.

The core element in the control of the digital automatic shifting system is a cycle counter ZZ which is controlled via a cadence or pulse generator TAKT with successive frequency-divider stages FT1, FT2 and FT3. The cycle counter is constituted substantially of a decadic counter with a decoder following same, from which ten cycles Z0 through Z9 appear at the ten outputs zzA0 through zzA9 of the cycle counter ZZ, the cycles Z0 and Z5 being longer. The outputs zzA0 and zzA5 are connected via one OR-gate OR10 with the address input 15 of a two-bit multiplexer M11 whose one data input 12 is connected with the output of the frequency divider FT2 and whose other data input 13 is connected with the output of the frequency divider FT3. The cycles Z0 and Z5 thus are longer by the value obtained from the frequency divider FT3.

The longer duration of the cycles Z0 and Z5 of FIG. 3 is required so that at the lowest operating speed at least five pulses from the RPM pulse generator at the turbine wheel or at the output shaft can be read into the pulse counter IZ. The remaining cycles Z1 through Z4 and Z6 through Z10, which only possess control functions, can be operated with a correspondingly higher frequency.

The ten cycles have the following control functions:

Z0: initiates during a first processing phase the period-duration comparison of the measured turbine RPM NTB with the limiting values of the turbine RPM stored in the fixed value storage SP. Further sequencing or timing during cycle Z0 is effected by pulse counter IZ.

Z1: quenches pulse counter IZ. For this purpose, output zzA1 of the cycle counter is connected via an OR-gate OR16 with a reset input izR28 of the pulse counter.

Z2: transfers the contents of comparison logic ABS/AFS into the converter-clutch storage WKS. For this purpose, the output zzA2 of the cycle counter ZZ is connected to the cadence or clock signal input wksT22.

Z3: has no control function.

Z4: quenches the comparison logic ABS/AFS. For this purpose, the output zzA4 is connected via two OR-gates OR17 and OR18 with the reset input afsR30 of the upshifting flip-flop AFS or via the OR-gate OR17 and OR 19 with the set input absS31 of the downshifting flip-flop ABS.

Z5: initiates during a second processing-phase the period-duration comparison of the measured rotation rate NAB of the output shaft with the speed-ratio-dependent and load-dependent up-and-down shifting limiting values stored in the fixed value storage SP. Further sequencing or timing during cycle Z5 is effected by pulse counter IZ.

Z6: quenches pulse counter IZ. For this purpose, output zzA6 is connected to OR-gate OR16.

Z7: transfers the contents of comparison logic AFS/ABS into up/down counter AZ. For this purpose, output zzA7 is connected via an inverter IN20 and an OR-gate OR21 with the cadence (timing) input azT40 of the up-down counter.

Z8: has no control function.

Z9: quenches comparison logic AFS/ABS. For this purpose the output zzA9 of the cycle counter ZZ is connected to OR-gate 17.

Figure 2:
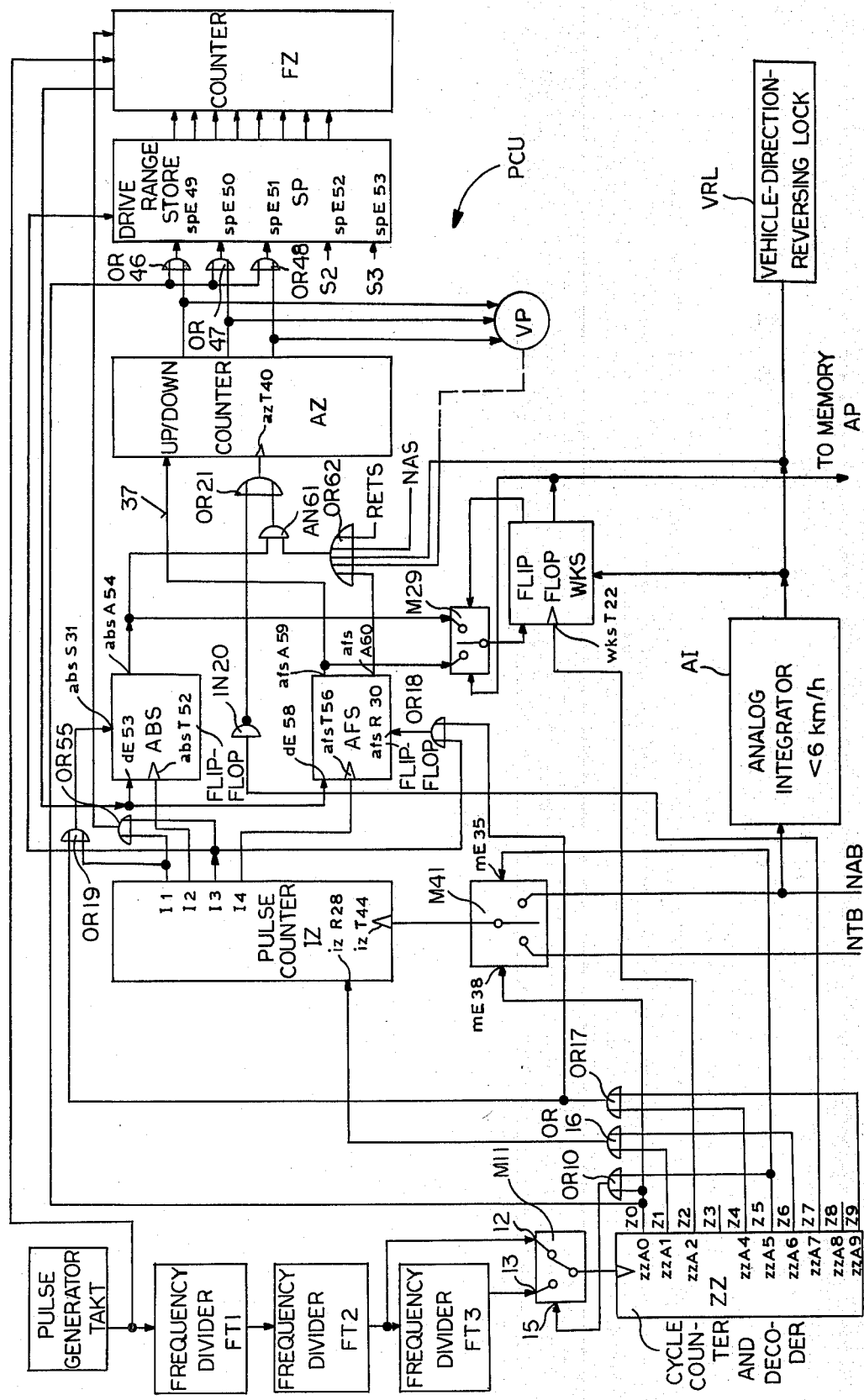
FIG. 2 shows an embodiment of a period-duration comparison unit shown in FIG. 1.

Further sequencing control during the cycle Z0 for the turbine RPM is now described with reference to FIG. 2.

With the cycle Z0 an address input mE38 of a four-bit-multiplexer M41 is controlled so that a pulse train of at least five pulses is applied from the tachometer of the turbine to the cadence or stepping input izT44 of a pulse counter IZ. Simultaneously, the shifting-point PROM SP is energized over three OR-gates OR46, OR47 and OR48 tied to its address inputs spE49, spE50 and spe51, thereby yielding the data for a downshifting window or comparison pulse.

A low-level pulse I1 from counter IZ during the first processing phase (determined by cycle Z0) enables via an OR-gate OR55 loading of the window counter FZ with the load-state-dependent data (e.g. in the form of a counter modulus) from the switch point PROM SP for determining the shifting, particularly the opening, of the converter clutch and controls the time location of downshift window with the positive or rising flank. The downshifting flip-flop ABS is set so that the output absA54 is in its "high" state. The pulse cadence I2 serves simultaneously as a measuring and control signal. With it there results in the downshift flip-flop ABS the comparison of the downshifting window with the input pulse from the tachometer on the turbine. For this purpose the pulse cadence I2, whose pulse duration is proportional to one turbine revolution, is applied to the cadence or clock input absT52 of the downshift flip-flop. The "D" or data input dE53 is connected to the window counter FZ. In the example shown in FIG. 4a, the window pulse has a longer duration than the measuring pulse or rotation-rate signal, I2. At the end of signal I2, the state "high" is transferred to the output absA54. A change in the output states does not occur; a downshift pulse is not present.

The pulse I3 enables via OR-gate OR55 the loading of the window counter FZ with the data (a counter modulus) from read-only memory SP forming a drive-range store for closing the converter clutch and with its positive flank starts the upshifting window or comparison pulse. The upshifting flip-flop AFS is reset so that at the output afsA59 the "low" state is found and the complementary output afsA60 is in its "high" state.

The rotation-rate signal or pulse I4 serves simultaneously as a measuring and control signal which is applied to the cadence or clock input afsT56 of shifting flip-flop AFS. The "D" or data input deE58 is connected to the window counter FZ. In the Example illustrated in FIG. 4a, the measuring pulse I4 is longer than the upshift window, i.e. terminates after the end or closing thereof.

The "low" state is transferred to the output afsA59 with the positive flank of pulse I4. A change in the output state does not result, there being no pulse for closing the converter clutch.

FIG. 4b shows the case of an upshifting. The measuring and control pulse (rotation-rate signal) I4 is here shorter than the comparison pulse for the upshifting window. The state "high" at the input deE58 is transferred by the positive flank of pulse I4 to the output afsA59 and signals thereby an upshifting control pulse.

In FIG. 4c, the duration of the rotation-rate signal I2 is greater than that of the comparison pulse for the downshift window. The "low" state at input dE53 is transferred with the positive flank of pulse I2 to the output absA54. A downshift pulse is thereby signaled.

With the period-duration comparison of the turbine RPM during the cycles Z0 through Z4, an up or downshift pulse (i.e. a clutch-engagement or clutch-disengagement control signal) is fed via a four-bit-multiplexer M29 to converter clutch storage or memory WKS (D-type flip-flop). The two address inputs are so energized through the two outputs of the flip-flop WKS that a closed converter clutch only downshifting pulses for opening and with an open converter clutch only pulses for closing traverse the flip-flop WKS.

A period-duration comparison of the output-shaft RPM during cycles Z5 through Z9 is effected analogously. An address input mE35 of the four-bit-multiplexer M41 is energized by cycle Z5 to transmit a pulse train of at least five pulses from the tachometer at the output shaft to the cadence or stepping input izT44 of pulse counter IZ. Upshifting or downshifting pulses are in this case supplied to an up/down counter AZ. For this purpose the output absA54 of the downshift flip-flop ABS is connected directly and the output afsA60 complementary to afsA59 of the upshift flip-flop AFS is connected indirectly via an OR-gate OR62 to an AND-gate AN61 and the latter is connected via an OR-gate OR21 to the cadence or stepping input azT40 of the up/down counter AZ. An upshifting or downshifting pulse at the up/down counter AZ triggers with a positive flank, a pulse from "low" to "high". If neither an upshifting or downshifting pulse appears, the outputs afsA60 and absA54 are found in the "high" state which is applied also to the input azT40 of the up/down counter. The cycle pulse Z7, inverted by the inverter IN20, which is fed to the OR-gate OR21 is thus suppressed. As soon as an upshifting or downshifting pulse is present, either the output absA54 or afsA60 is transformed into the "low" state and the input azT40 of the up/down counter is found in the "low" state and the inverted cycle pulse Z7 effects with its positive flank an upshift or downshift in the up/down counter (i.e. an increase or decrease in the contents thereof).

To establish a counting direction upon the application of a pulse to the cadence input azT40 of the up/down counter AZ, the output afsA59 of the upshifting flip-flop is connected via a line 37 with the up/down counter. A low signal on line 37 makes component AZ a backwards counter whereas a high-level signal makes component Az an up or forwards counter.

If the vehicle is already in the highest speed ratio of a drive program or a signal RETS or NAS from the retarder or the auxiliary output shaft is present, an upshift should be prevented. Consequently a high signal is provided at inputs of the OR gate OR62. An upshift signal in the form of the "low" state at output afsA60 of the upshifting flip-flop AFS is thus suppressed.

In the following, the preselection circuit DPP of FIG. 5 is described.

A drive-program selection is supplied to preselection counter or register VZ in dual-coded form. Preselection comparator, VK, connected in parallel to the preselection counter VZ, recognizes a drive-program change. Programmable fixed-value storage, a or read-only memory VP is addressed over three inputs vpE100, vpE101 and vpE102 from the up/down counter AZ as to the speed-ratio state. The further addressing is effected over the two inputs vpE103 and vpE104 from the preselection counter VZ. The following drive programs are possible, by way of example:

W1: Speed ratio (or gear) 3 to speed ratio (or gear) 6.
W2: Speed ratio 2 to speed ratio 4.
W3: Speed ratio 2 to speed ratio 3.
W4: Speed ratio 1.

If a drive-range narrowing is to be effected, for example, from drive program W1 to program W2, the preselection comparator VP recognizes that change and produces a signal L for storage in the preselection counter. If the vehicle is, for example, still in its fifth speed, an upshifting is impossible. Because of the new addressing effected by the drive-program change in the preselection PROM VP, there appears at the output vpA8 of the preselection PROM VP, which is connected via an OR-gate OR63 with the OR-gate OR62 of the period-duration comparator unit PCU, a high-level logic signal. An upshifting, i.e. increase in contents, up/down counter AZ is thus precluded or blocked.

As soon as a downshifting into the fourth speed is effected in the up/down counter and the vehicle is in the selected drive program W2, an upshifting into the fifth or sixth speeds is not possible: a "high" signal at the output vpA6 of the preselector PROM VP and a "high" signal from preselector comparator VK produces via and AND-gate AN110 a "high" signal at OR-gate OR62. A possible upshifting in the up/down counter is precluded. Should a vehicle speed-range widening be undertaken, e.g. a change from program W4 to program W3, this selection change becomes effective only when the speed-ratio information permits it. As soon as preselection comparator VK recognizes a program change, a "high" signal is developed at output vkA122 and a low signal at output vkA120 lifts the upshifting lock. The drive program change is, however, only read into preselector counter VZ when the vehicle has accelerated sufficiently that upshifting into second speed has occurred. The preselector PROM VP is so programmed that a "high" signal is applied at the output vpA5. This "high" signal triggers, together with the "high" signal at output vkA122 of the preselector comparator VZ, the read-in procedure for the new drive program. In the neutral position N the preselector VZ is extinguished.

Figure 6:
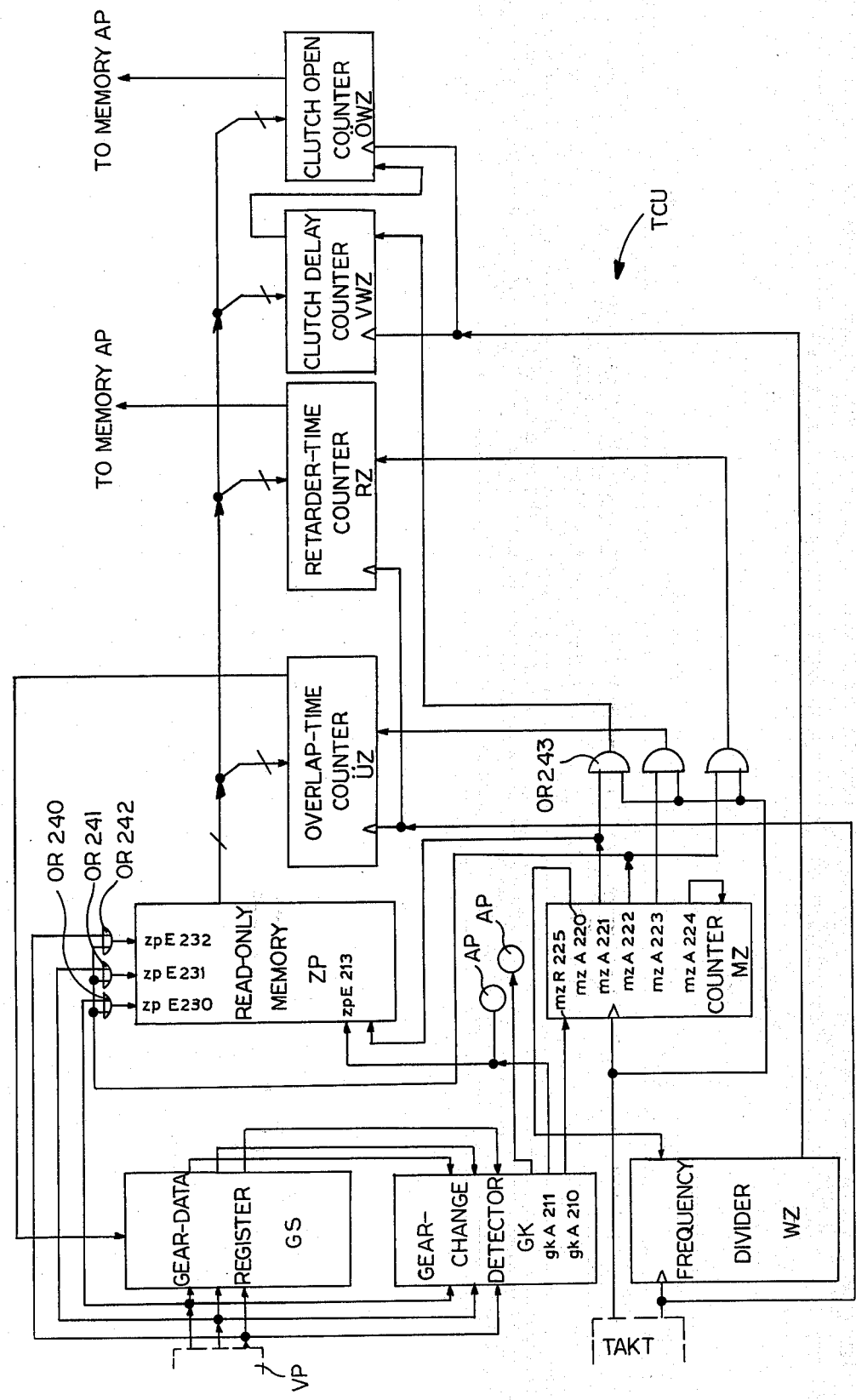
FIG. 6 shows an embodiment of a timing circuit.

Below the function and control of the timing circuit of FIG. 6 is described.

The speed-ratio storage or register GS contains the last effective speed-setting information. Speed-ratio comparator GK or monitor GK connected in parallel with register GS recognizes the same speed-ratio state from the input and output of the speed-ratio register and transmits continuously via the "actual" output gkA210 a "high" signal to the reset input mzR224 of a multiplexer/counter MZ. If a speed change is initiated, the speed-change comparator GK recognizes a difference between the information stored in register GS and the new information and starts via the output gkA210, whose "high" signal disappears, the multiplexer/counter MZ which effects on the one hand the addressing of the fixed-value storage (time PROM ZP) and on the other hand loads the timing information into the different counters.

The addressing of the data stored in time PROM ZP is effected over one of three inputs zpE230, zpE231 and zpE232 over which the speed state is fed with dual coding, and via the speed comparator GK and multiplexer/counter MZ. For this purpose, a "high" signal from the output gkA211 of the speed comparator GK is applied with an upshifting to the input zpE213 of the timing PROM and with downshifting a low signal is so applied.

Upon recognition of a speed change, the multiplexer/counter MZ resets initially over the first output mzA220, a converter-clutch counter WZ. With a second pulse from output mzA221, a converter-clutch-delay counter VWZ and a converter-clutch-opening counter ÖWZ are energized via an OR gate OR 243 and corresponding data (counter moduli) are read from the time PROM ZP. With a third pulse from output mzA222, the read-in stage of the retarder opening time into the retarder-time counter RZ is started. The addressing of the retarder opening time stored in the time PROM ZP (in the form of a counter modulus) is effected via three OR-gates OR240, OR241 and OR242 to the inputs zpE230, zpE231 and zpE232. Via the fourth output mzA223 of the multiplexer/counter MZ a step is commenced for reading the overlap time (coded in a counter modulus) into an overlap counter ÜZ from memory ZP. Via the fifth output mzA224, the multiplexer/counter MZ is stopped.

The four above-mentioned interval-measuring counters are backward counters which count backwards from the read-in information to the respective zero levels and again lock. The converter-clutch-opening counter ÖWZ is started initially by a transfer from the converter-clutch-delay counter VWZ. The back-counting operation is cadence controlled whereby the converter clutch counter WZ controls the converter-clutch-delay counter VWZ and opening counter ÖWZ. The thus provided input frequency being divided by a factor of 10 to provide a large time spacing. When the overlap time runs out, the speed-ratio register GS is newly charged and thus contains the new speed-ratio information. The speed comparator GK recognizes the same information at the input and output sides of the speed storage GS and resets the multiplexer/counter MZ via the output gkA210.

The transmission-specific clutch combinations are stored in output PROM AP (FIGS. 1 and 7). The energization is effected through the speed-dependent and selection-combined speed-ratio information from memory VP (FIGS. 1 and 5). For this purpose, the three inputs apE300, apE301 and apE302 are provided. If an upshifting or downshifting is effected, the comparator GK is energized to produce a high signal at an input apE303 or apE304 to release each stored clutch combination which is actuated during the overlap time.

After the elapse of the overlap time, as described above, the new speed information is read into the speed-state register GS, the speed comparator (or gear-change detector) GK establishing no further speed change so that the low start at the output PROM AP, input apE303 or apE304, applies. The PROM AP is triggered further by the speed-dependent and preselection-combined speed information.

If a reverse operation is triggered, the output PROM AP receives a high signal R at both the inputs apE303 and apE304.

To increase the transmission-shifting reliability, the various features are provided, inter alia, the output comparator AK is provided which generates a disturbance or alarm signal, upon the inequality of the information at the outputs of the output PROM AP and a magnetic-valve control AT, via a time-delay network T and an inverter IN310, this signal being applied via the chip-selected input apE311 of the output PROM to deenergize all of the magnetic valves as in an emergency. Simultaneously, this alarm signal is applied to the input akE320 of the output comparator AK. Because the complementary input akE321 is in the low state, the alarm signal is maintained after the cutoff of the magnetic valves.

If there is a transient error or foreign effect creating a disturbance, this can be eliminated by shifting into the neutral setting N. For this purpose, at the input akE321 of the output comparator AK a brief "high" state is applied so that the output comparator recognizes unity and eliminates the alarm signal.

As a further safety device, a recognition unit AI for speeds less than 6 km per hour is provided. If the vehicle's speed drops below this maximum value, to avoid signaling a failure, the values in the up/down counter AZ for first speed are fixed so that an upshifting is not possible. Nevertheless a signal is applied to the converter-clutch storage WSK to open the converter clutch so that, upon braking, a stalling of the drive engine is prevented. Furthermore, the detection of speeds below 6 km per hour can be used to prevent a direction change (e.g. from forward to reverse) at higher speeds. Only when the speed is below 6 km per hour will actuation of the switch for reverse travel apply a signal at the output PROM AP. Upon a cutoff of the generator signals at the turbine wheel or output shaft, the period-duration comparator excludes false shifting in the transmission. Since the measuring pulses I0 through I4 (FIGS. 4a–4c) also control the sequencing in the period-duration comparator, the last speed state stored in the up/down counter AZ is maintained automatically even upon failure of the signals. Downshifting from a high speed to a low speed which may be detrimental for the transmission and the drive engine is thus avoided.

Upon setting the vehicle in operation and operating the automatic transmission shifting device, a defined output state in the up/down counter AZ must be established. Thus in the neutral setting N of the drive program lever or selector (see FIG. 5) the up/down counter AZ is extinguished and set to a zero level. If the drive program lever is not set first into the neutral position N upon startup, an alarm signal is generated until it is shifted to neutral N.

I claim:
1. In an automotive vehicle having a gear-type transmission for transferring rotary power from an engine to an output shaft, said transmission having a multiplicity of gears, an electronic device for automatically shifting said transmission, comprising:
   first memory means for storing in coded form speed ranges for said gears under different loading conditions;
   addressing means operatively linked to said memory means for feeding thereto address signals in accordance with engine load and engaged gear;
   window-generating means responsive to signals from said memory means for emitting upshifting comparison pulses and downshifting comparison pulses with durations varying as functions of engine load and engaged gear;
   sensor means juxtaposed to said output shaft for emitting a signal coding the instantaneous rotation rate thereof;
   timing means responsive to the signal from said sensor means for generating during each operating cycle a first rotation-rate signal and a second rotation-rate signal each having a duration proportional to said instantaneous rotation rate, said timing means being operatively linked to said window-generating means for synchronizing the emission of said upshifting comparison pulse with said first rotation-rate signal and the emission of said downshifting comparison pulse with said second rotation-rate signal;

comparator means for comparing said instantaneous rotation rate with said speed ranges to control the shifting of said transmission, said comparator means including an upshifting flip-flop and a downshifting flip-flop, both of the D-type, with inputs connected to said window-generating means for receiving therefrom said upshifting comparison pulses and said downshifting comparison pulses, respectively, and to said timing means for receiving therefrom said first rotation-rate signal and said second rotation-rate signal, respectively, said upshifting flip-flop generating an upshifting control signal upon an exceeding of an upper speed limit by said instantaneous rotation rate and said downshifting flip-flop generating a downshifting control signal upon an exceeding of said instantaneous rotation rate by a lower speed limit;

second memory means for storing in coded form the engaged gear of said transmission, said comparator means being operatively connected to said second memory means for updating the contents thereof in accordance with said upshifting control signal and said downshifting control signal; and energization means operatively controlled by said second memory means for operating gear-shift actuators in said transmission.

2. The device defined in claim 1 wherein said vehicle includes between said engine and said transmission a torque converter with a turbine and a clutch for bridging said converter, further comprising detector means juxtaposed to said converter for emitting a signal coding the rotation rate of said turbine, said timing means including time-division means for dividing an operating cycle into a first processing phase for determining the operating state of said clutch and a second operating phase for determining the engaged gear of said transmission, said timing means being operatively connectable to said detector means for emitting to said upshifting flip-flop and said downshifting flip-flop during said first processing phase a third rotation-rate signal and a fourth rotation-rate signal, respectively, each having a duration proportional to the instantaneous turning speed of said turbine, said window-generating means emitting to said upshifting flip-flop and said downshifting flip-flop during said first processing phase, in response to speed-range signals from said first memory means and synchronization signals from said timing means, a first additional comparison pulse and a second additional comparison pulse having durations varying as functions of engine load and engaged gear ratio, said upshifting flip-flop emitting a clutch-engagement control signal for closing said clutch upon an exceeding of a maximum speed by said instantaneous turning speed and said downshifting flip-flop emitting a clutch-disengagement control signal upon an exceeding of said instantaneous turning speed by a speed minimum, further comprising third memory means updatable by said clutch-engagement and said clutch-disengagement control signals for containing in coded form the operation state of said clutch.

3. The device defined in claim 2 wherein said flip-flop have data inputs connected to said window-generating means and clock inputs connected to said timing means, said upshifting flip-flop emitting said upshifting control signal in the event that said first rotation-rate signal has a shorter duration than an upshifting comparison pulse from said window-generating means, said downshifting flip-flop emitting said downshifting control signal in the event that said second rotation-rate signal has a longer duration than a downshifting comparison pulse from said window-generating means.

4. The device defined in claim 3, further comprising selector means for emitting signals coding a preselected drive program, fourth memory means responsive to gear-state signals from said second memory means and to drive-program signals from said selector means for generating a disabling signal to prevent the upshifting of said transmission, and blocking means at an input of said second memory means for preventing, in response to said disabling signal, the updating of the contents of said second memory means by said upshifting control signal.

5. The device defined in claim 4, further comprising monitor means operatively connected to said fourth memory means for detecting a gear change, said energization means including fifth memory means addressable by signals from said fourth memory means and said monitor means for generating actuator control signals in accordance with gear-state information from said second memory means and drive-program information from said selector means.

6. The device defined in claim 4 wherein said fourth memory means emits said disabling signal upon detecting the attainment of the highest gear of a selected drive program.

7. The device defined in claim 3, further comprising sequencing means between said second memory and said energization means for controlling the durations of gear-shifting operations effectuated by said energization means.

8. The device defined in claim 7, further comprising register means operatively connected to said second memory means for receiving gear-state information therefrom and monitor means connected in parallel with said register means for detecting a gear change, said sequencing means including a counter steppable by a pulse generator and storage means responsive to gear-state information from said second memory means and a gear-change signal from said monitor means for modifying the modulus of said counter, said counter having an output lead extending to an input of said register means for enabling the updating of the contents thereof with signals from said second memory means.

9. The device defined in claim 8 wherein said sequencing means includes measuring means for deactuating said clutch to open said converter for a predetermined interval during a gear-change operation, said measuring means having a first additional counter steppable by said pulse generator and operatively connected to said clutch for determining a clutch-deactuation interval and a second additional counter steppable by said pulse generator and operatively connected to said clutch for determining a delay interval prior to and contiguous with said clutch-deactuation interval, said storage means being linked to said additional counters for modifying the moduli thereof in accordance with gear-state information and upon occurrence of a gear change.

10. The device defined in claim 9 wherein said sequencing means includes multiplexing means feeding an address input of said storage means for dividing an operational cycle of said sequencing means into a plurality of phases during each of which a modulus is transmitted from said storage means to a respective one of said counters.

11. The device defined in claim 3 wherein said vehicle includes a retarder, further comprising monitor means operatively connected to said second memory means for detecting a gear change, measuring means including a counter steppable by a pulse generator for determining an actuation interval for said retarder, and storage means operatively linked to said second memory means and said monitor means for modifying the modulus of said counter in accordance with gear state and upon occurrence of a gear change.

12. The device defined in claim 3 wherein said vehicle includes a retarder, further comprising blocking means operatively connected to an input of said second memory means and having an input from said retarder for preventing the updating of the contents of said second memory means by said upshifting control signal upon an energization of said load indicating operation of said retarder.

13. The device defined in claim 3 wherein said vehicle has an auxiliary output shaft, further comprising blocking means at an input of said second memory means for preventing the updating of the contents of said second memory means by said upshifting control signal during the driving of a load by said auxiliary output shaft.

14. The device defined in claim 3, further comprising analog detector means operatively tied to said sensor means and said third memory means for preventing an actuation of said clutch and thereby a bridging of said converter upon detecting a vehicle speed less than a predetermined maximum, further comprising blocking means operatively connected to an input of said second memory means and to said analog detector means for preventing an updating of the contents of said second memory means by said upshifting control signal upon the detection by said analog detector means of a vehicle speed less than said maximum, said vehicle including locking means for preventing a change in drive direction, said analog detector means being operatively connected to said locking means for releasing same to enable a change in drive direction upon detecting a vehicle speed less than said maximum.

15. The device defined in claim 3 wherein said timing means is operable to prevent changes in the contents of said second memory means and said third memory means upon a failure of the signal outputs of at least one of said sensor means and said detector means.

* * * * *